(12) United States Patent
Dobryniewski

(10) Patent No.: US 10,089,121 B2
(45) Date of Patent: Oct. 2, 2018

(54) SYSTEM AND METHOD FOR MANAGING DISPLAY-RELATED RESOURCES

(71) Applicant: ADVANCED DIGITAL BROADCAST S.A., Geneva (CH)

(72) Inventor: Jacek Dobryniewski, Zielona Gora (PL)

(73) Assignee: ADVANCED DIGITAL BROADCAST S.A., Eysins (CH)

( * ) Notice: Subject to any disclaimer, the term of this patent is extended or adjusted under 35 U.S.C. 154(b) by 64 days.

(21) Appl. No.: 15/206,275

(22) Filed: Jul. 10, 2016

(65) Prior Publication Data

US 2017/0017498 A1 Jan. 19, 2017

(30) Foreign Application Priority Data

Jul. 13, 2015 (EP) .................................. 15176377

(51) Int. Cl.
| | |
|---|---|
| *G06F 1/32* | (2006.01) |
| *G06F 9/451* | (2018.01) |
| *H04N 21/443* | (2011.01) |
| *H04N 21/439* | (2011.01) |
| *H04N 21/44* | (2011.01) |

(52) U.S. Cl.
CPC ............ *G06F 9/451* (2018.02); *G06F 1/3209* (2013.01); *G06F 1/3265* (2013.01); *H04N 21/4394* (2013.01); *H04N 21/44008* (2013.01); *H04N 21/4436* (2013.01); *Y02D 10/153* (2018.01)

(58) Field of Classification Search
CPC .... G06F 1/3231; G06F 1/3209; G06F 1/3265; G06F 1/32; G06F 9/4443; G06F 9/451; H04N 21/23
See application file for complete search history.

(56) References Cited

U.S. PATENT DOCUMENTS

| | | | |
|---|---|---|---|
| 6,374,145 B1 | 4/2002 | Lignoul | |
| 6,404,447 B1 | 6/2002 | Kitagawa | |
| 2005/0204190 A1* | 9/2005 | Cromer | G06F 1/3206 714/14 |
| 2006/0161854 A1* | 7/2006 | Kim | G09G 5/00 715/764 |
| 2009/0300381 A1* | 12/2009 | Chen | G06F 1/3209 713/310 |
| 2011/0055602 A1* | 3/2011 | Kamay | G06F 1/3228 713/320 |
| 2011/0154270 A1 | 6/2011 | Sonoda | |
| 2012/0173890 A1* | 7/2012 | Root | G06F 1/1632 713/300 |
| 2014/0351327 A1* | 11/2014 | Huang | H04L 65/1069 709/204 |
| 2017/0017291 A1* | 1/2017 | Dobryniewski | H04N 21/233 |

* cited by examiner

*Primary Examiner* — Mahelet Shiberou
(74) *Attorney, Agent, or Firm* — Mark M. Friedman

(57) ABSTRACT

A computer-implemented method for managing display-related resources, the method comprising the steps of: receiving (101) an input sequence of images from a remote server; analyzing (102) the input sequence for presence of input activity at the remote server; in case of activity presence, configuring (103) the display-related resources not to invoke a resources saving action.

6 Claims, 3 Drawing Sheets

SYSTEM AND METHOD FOR MANAGING DISPLAY-RELATED RESOURCES

The present invention relates to a system and method for managing display-related resources. In particular, the present invention relates to managing screen saver and/or screen dimming functions in view of certain state(s) of the underlying software.

A screensaver (or screen saver) is a computer program that blanks the screen or fills it with moving images or patterns when the computer is not in use. Initially designed to prevent phosphor burn-in on CRT and plasma computer monitors (hence the name), screensavers are now used primarily for entertainment, security or to display system status information (source: Wikipedia).

Further, modern operating systems have an automatic screen-dimming function, This in turn allows to save energy consumed by a given display. In battery powered devices with a screen, the system configuration provides a timeout setting. After such timeout the screen is switched to a low brightness mode, After a second timeout, the screen may be fully switched off. The respective timeouts are typically counted from the last activity of any input device available at a certain computer system. These input devices may include a mouse, a touchpad, a keyboard, a trackball or the like.

During computer use, there are certain situations of long inactivity, when, despite its purpose, application managing display-related resources seems inappropriate. Such situations include an Internet television content playback or a video call or a video conference or web meetings or remote desktop sharing or webinar applications. All of these situations have in common a feature of obtaining sequences of images from a remote computer (a server).

A skilled person, wishing to influence the managing of display-related resources has currently three options, inherent of the respective systems: (a) to disable the management of display related resources completely (which is inconvenient, requires specific knowledge and frequently users may have no time to configure desired timeout parameters or may forget to enable the management); (b) to configure exceptionally long timeouts (sometimes not provided for by operating systems); (c) to frequently use available input devices, such as a keyboard or a mouse (which is inconvenient and requires approaching the computer).

Prior art discloses a "Mouse with a screen saver control function" US 20080120578 A1, describing a mouse, comprising: a screen saver control button configured for generating a signal when receiving an operational input from a computer user; a memory unit for storing a simulation program; and a micro-processing unit configured for running the simulation program when receiving the signal from the screen saver control button, and generating simulated input signals to a computer connected thereto.

A drawback of this solution is a necessity for a specific hardware as well as a requirement for manual operation of the screen saver control button.

Another prior art solution U.S. Pat. No. 6,374,145 B1 entitled "Proximity sensor for screen saver and password delay" discloses an apparatus comprising: an interface module interpretable between a user-input device and a computer-input port of a computer, said interface module including a first connector connectable to said user-input device and a second connector connectable to said computer-input port; a proximity sensor operatively coupled to said interface module, said proximity sensor operative to detect the presence of a user; and a control module, said control module controllably coupled to said proximity sensor and said interface module, said control module having a state machine operative to cause information emulating a user input from a peripheral device of the computer to be transmitted to said computer via said interface module based on an output signal provided by said proximity sensor to prevent the activation of a computer program. In particular said computer program is a screen saver program.

A drawback of this solution is a necessity for a specific hardware (a further physical input device) as well as a complex software.

Thus, there exists an unaddressed need for an alternative method, being especially adapted for cases where a client computer, equipped with a screen saver and/or screen dimming software, obtains sequences of images from a remote computer (a server).

The aim of the development of the present invention is an improved and effective system and method for managing display-related resources.

SUMMARY AND OBJECTS OF THE PRESENT INVENTION

The first object of the present invention is a computer-implemented method for managing display-related resources, the method comprising the steps of: receiving an input sequence of images from a remote server; analyzing the input sequence for presence of input activity at the remote server; in case of activity presence, configuring the display-related resources not to invoke a resources saving action.

Preferably, the input activity is evidence of use of input means selected from a group comprising a mouse, a touchpad, a keyboard, a remote control.

Preferably, an object detection method for images or sequences of images is employed in order to detect cursor movement and/or typing activity.

Preferably, the input sequence of images comprises an associated audio signal and the analyzing step comprises monitoring the associated audio in order to detect keystrokes sounds or mouse clicks.

Preferably, the resources saving action includes inhibiting invoking of a screen saver or reducing screen brightness in order to reduce energy consumption.

Another object of the present invention is a computer program comprising program code means for performing all the steps of the computer-implemented method according to the present invention when said program is run on a client computer.

Another object of the present invention is a computer readable medium storing computer-executable instructions performing all the steps of the computer-implemented method according to the present invention when executed on a computer.

BRIEF DESCRIPTION OF THE DRAWINGS

These and other objects of the invention presented herein, are accomplished by providing a system and method for managing display-related resources. Further details and features of the present invention, its nature and various advantages will become more apparent from the following detailed description of the preferred embodiments shown in a drawing, in which.

NOTATION AND NOMENCLATURE

Some portions of the detailed description which follows are presented in terms of data processing procedures, steps or other symbolic representations of operations on data bits that can be performed on computer memory. Therefore, a computer executes such logical steps thus requiring physical manipulations of physical quantities.

Usually these quantities take the form of electrical or magnetic signals capable of being stored, transferred, combined, compared, and otherwise manipulated in a computer system. For reasons of common usage, these signals are referred to as bits, packets, messages, values, elements, symbols, characters, terms, numbers, or the like.

Additionally, all of these and similar terms are to be associated with the appropriate physical quantities and are merely convenient labels applied to these quantities. Terms such as "processing" or "creating" or "transferring" or "executing" or "determining" or "detecting" or "obtaining" or "selecting" or "calculating" or "generating" or the like, refer to the action and processes of a computer system that manipulates and transforms data represented as physical (electronic) quantities within the computer's registers and memories into other data similarly represented as physical quantities within the memories or registers or other such information storage.

A computer-readable (storage) medium, such as referred to herein, typically may be non-transitory and/or comprise a non-transitory device. In this context, a non-transitory storage medium may include a device that may be tangible, meaning that the device has a concrete physical form, although the device may change its physical state. Thus, for example, non-transitory refers to a device remaining tangible despite a change in state.

As utilized herein, the term "example" means serving as a non-limiting example, instance, or illustration. As utilized herein, the terms "for example" and "e.g." introduce a list of one or more non-limiting examples, instances, or illustrations.

Description of Embodiments

Figure 1:
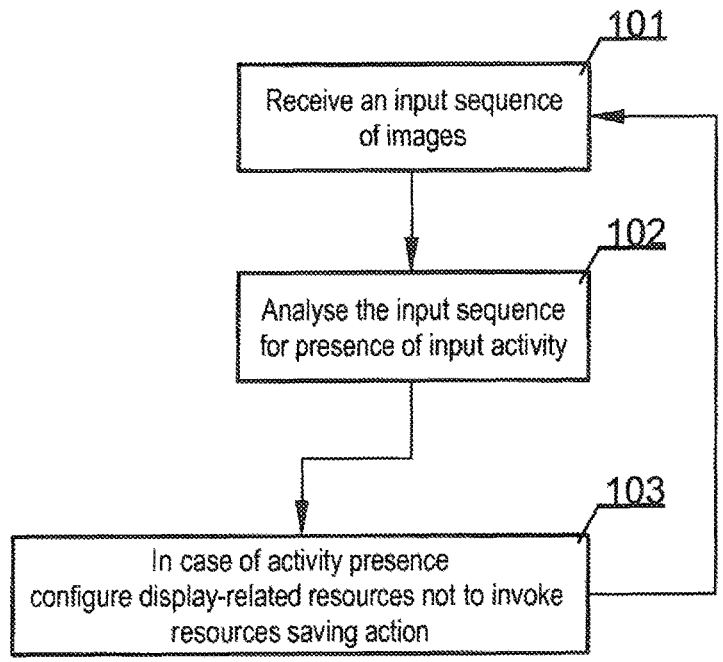
FIG. 1 presents a diagram of a first embodiment of the method according to the present invention.

FIG. 1 presents a diagram of a first embodiment of the method according to the present invention. This embodiment operates on a client device. The method starts at step (101) from receiving an input sequence of images. A sequence of images obtained from a remote computer (a server) may relate to applications such as an Internet television content playback or a video call or a video conference or web meetings or remote desktop sharing or webinar applications.

Said sequence of images may be a real time sequence of 25 or more frames per second (e.g. television content encoded according to standard techniques such as AVC (Advanced Video Coding) or HEVC (High Efficiency Video Coding)) or the sequence of images may comprise fewer frames per second (e.g. webinar).

Subsequently, at step (102), there is executed analysis of the input sequence for a presence of one or more input activity cues at the server. The input activity is understood as evidence of use of input means such as a mouse/touchpad (cursor movement) or text input in text input fields (keyboard use) at the remote computer (the server).

Preferably, it is the application that requested the server to provide the input sequence of images, which will execute the aforementioned analysis. Alternatively, there may be another application executed that will only monitor a specific section of the output signal generated for a display screen at the client (this application may also analyze audio signal generated to be output by the client). The section may be a full screen image or any portion of said image, while said portion may be defined by a user with a mouse. Such definition will, for example, require virtually drawing a square, or rectangle, or any other shape using a mouse. This will result in defining a set of coordinates applicable to output signal generated for a display screen at the client. For example, a rectangle having coordinates in pixels (100, 110) and (800, 900) will be subject to monitoring by the additional application. The second approach is beneficial as it does not require any modifications to the existing applications supporting an Internet television content playback or a video call or a video conference or web meetings or remote desktop sharing or webinars.

A suitable object detection method for images or sequences of images may be employed in order to detect cursor movement and/or typing activity. For example, cursor's position may be detected in one image as well as detected in a subsequent image. A relative displacement of the cursor, within the image area, may serve as an input activity cue. Exemplary object detection methods may include SIFT (Scale-Invariant Feature Transform) or SURF (Speeded Up Robust Features) methods applicable in computer vision for tasks such as object recognition.

In case of presence of audio together with the input sequence of images, an input activity cue detection may include monitoring audio in order to detect keystrokes sounds or mouse clicks (for example using a method disclosed in Keyboard typing detection and suppression—US20140244247A1). Moreover, audio may be monitored for detection of voice(s) of a speaker(s) talking, for example, during a web teleconference.

In a more general approach, content of two input sequence's images may be compared as such and in case a difference exceeds a predefined threshold, an input activity cue may be signaled. Such threshold (considered as a count of changed pixels with respect to the complete monitored image) may take into account image compression artifacts, noise etc.

A frequency of input activity cue(s) monitoring may be adjusted depending on an application. Preferably, the detection is executed every few seconds.

Next, at step (103), in case of activity presence (or presence of activity cue(s)) configuring management of display-related resources, not to invoke resources saving action i.e. not to invoke a screen saver or not to reduce screen brightness in order to reduce energy consumption. Thus a resources saving action will not be invoked while the client generates an output signal, for a display device, based on the input sequence of images.

Thus, in this embodiment, the server side is not modified by any means, In turn the second embodiment adapts also the server side.

Figure 2:
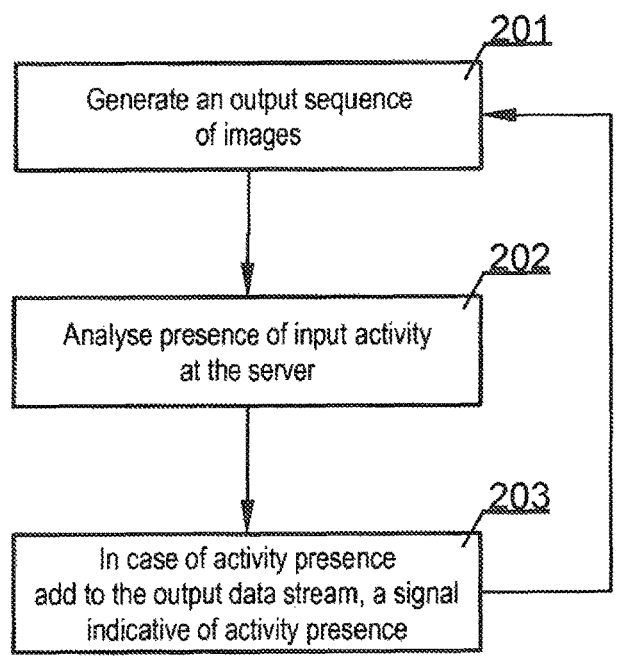
FIG. 2 presents a diagram of a second embodiment of the method according to the present invention.

FIG. 2 presents a diagram of a second embodiment of the method according to the present invention. This method operates mainly at the server device while a client device uses notifications obtained from the server in order to control management of display-related resources.

The method starts at step (201), from receiving an input sequence of images at the server. The input sequence of images being intended as part of an output to a client device. The input sequence of images may be computer generated at the server (e.g. in case of a webinar) or obtained from a source external to the server (e.g. a camera).

Subsequently, at step (202), there is executed analysis of presence of input activity at the server. The input activity may originate from any input device (an activity source) such as mouse movement, touch on a touchpad, keystroke of a keyboard or navigation of a presentation by means of a presentation remote control unit cooperating with the server.

Next, at step (203), in case of activity presence at the server, there is added, to the output data stream, a signal indicative of activity presence. In its simplest form, the signal may be just a single bit flag indicating activity on any of the monitored activity sources. This data bit may be periodically transmitted as a part of the output to a client device.

The input activity (speaking action) may also originate from audio registered by a microphone connected to the server, the microphone preferably recording voice(s) of speaker(s).

In a more complex embodiment, the signal indicative of activity presence may define activity source (mouse, keyboard etc.) and/or last activity time.

When a client device receives the signal indicative of activity presence, together with images sequence for a given software application, the signal indicating presence of activity, the client software application takes certain measures based on the signal. This application is preferably responsible for identifying the signal indicative of activity presence and for configuring management of display-related resources, not to invoke resources saving action i.e. taking actions directed at not invoking a screen saver or not reducing screen brightness in order to reduce energy consumption. Thus a resources saving action will not be invoked while the client generates an output signal, for a display device, based on the input sequence of images.

Prohibiting invoking resources saving action may include executing an action leading to resetting a threshold timer of the screen saver or screen dimming. This action may be the actual resetting of the threshold timer or generation of a local activity event so that the client's operating system receives an input (indirectly leading to resetting of the threshold timer). There are certain types of input that will not influence the behavior of the operating system, such input may be pressing of a Shift or a Control or an Alt or a PrntScr key. Preferably, the method, according to the present invention, does not interfere with screen saver or screen dimming configuration parameters as set by a user of the client device.

Figure 3:
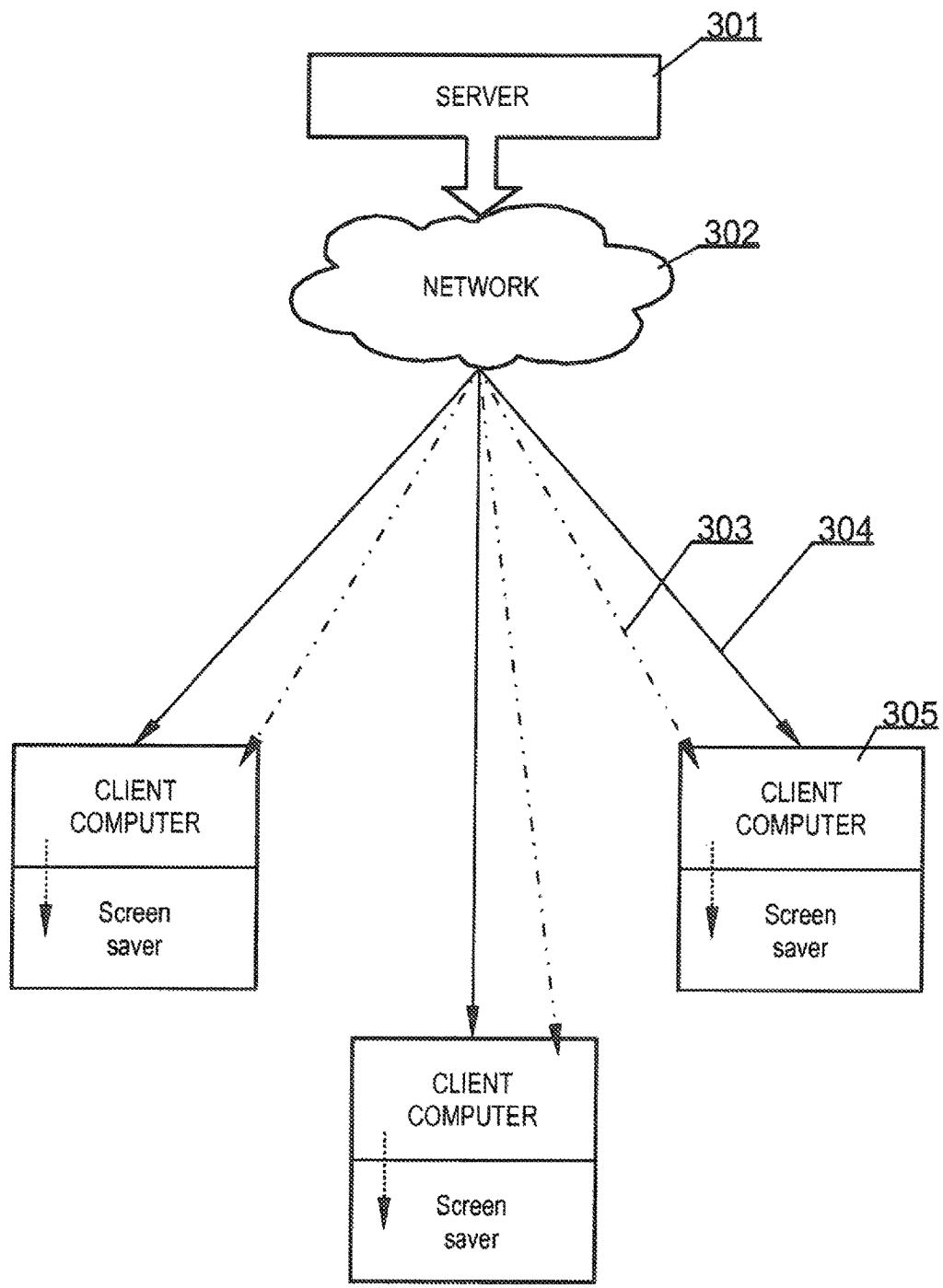
FIG. 3 shows an overview of a system according to the present invention.

FIG. 3 presents a general overview of the system implementing the method shown in FIG. 2. A server (301) obtains an input sequence of images, optionally audio data associated with the input sequence as well as generates the signal indicative of activity presence. Using a network communication (302) such as the Local area network or the Internet, the server sends the input sequence of images (304) and optionally audio data associated with the input sequence as well as the signal indicative of activity presence (303) to at least one client device (305).

Figure 4:
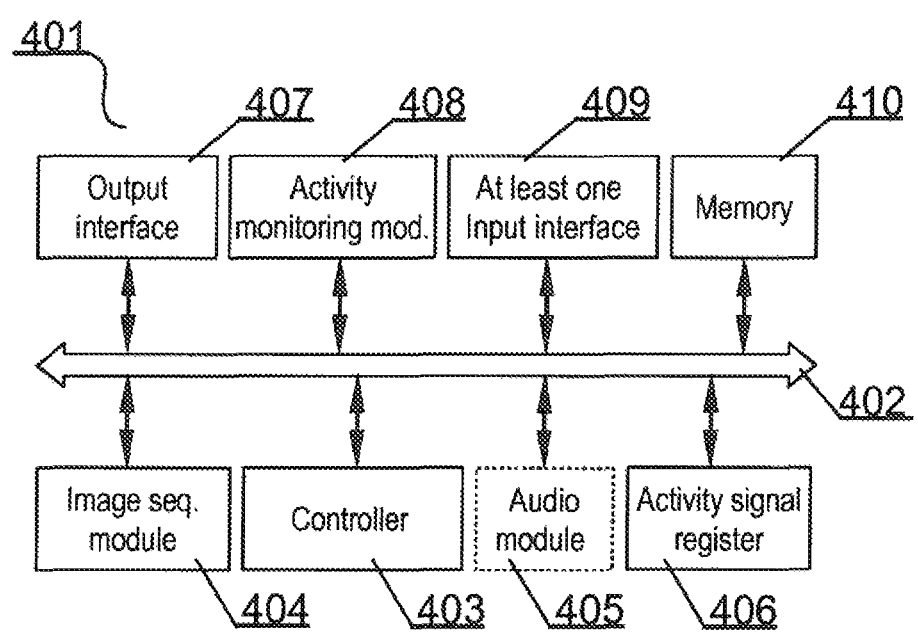
FIG. 4 presents a general overview of the server implementing the method shown in FIG. 2.

FIG. 4 presents a general overview of the server implementing the method shown in FIG. 2. The server (401) may be realized using dedicated components or custom made FPGA or ASC circuits. The system comprises a data bus (402) communicatively coupled to other components of the system, including a memory (403).

The memory (403) may be used for storage of any software and/or temporary processing results. Additionally, other components of the system are communicatively coupled to the system bus (402) so that they may be managed by a controller (403) configured to execute all the method steps according to the aforementioned FIG. 2.

The server must obtain an input sequence of images. As already explained, the input sequence of images may be computer generated at the server or obtained from a source external to the server. The result is that an image sequence module (404) has access to an input sequence of images, which is ready to be appropriately passed to an output interface (407) being communicatively coupled to at least one client's input interface.

Similarly, an optional audio module (405) has access to an input sequence of audio data, associated with the input sequence of images, which is ready to be appropriately passed to an output interface (407). The output interface may use an appropriate data delivery such as data streaming, dependent on the type and bandwidth of the output interface (407).

Further, the system comprises an activity monitoring module (408) configured to monitor at least one input interface (409), as previously explained, in order to generate a signal indicative of activity presence as explained with reference to FIG. 2. The result of the activity monitoring may be stored in an activity signal register (406), which typically will be a single bit register.

The present invention improves management of display-related resources during presentation of input images sequence(s) thus resulting in an improved user experience without requiring any additional external devices as well as any explicit actions from a user. Therefore, the invention provides a useful, concrete and tangible result.

Applications of the present invention involve management of display-related resources during presentation of input images sequence(s) such as an Internet television content playback or a video call or a video conference or web meetings or remote desktop sharing or webinar applications. Thus the machine or transformation test is fulfilled and the idea is not abstract.

It can be easily recognized, by one skilled in the art, that the aforementioned method for managing display-related resources may be performed and/or controlled by one or more computer programs. Such computer programs are typically executed by utilizing the computing resources in a computing device. Applications are stored on a non-transitory medium. An example of a non-transitory medium is a non-volatile memory, for example a flash memory while an example of a volatile memory is RAM. The computer instructions are executed by a processor. These memories are exemplary recording media for storing computer programs comprising computer-executable instructions performing all the steps of the computer-implemented method according the technical concept presented herein.

While the invention presented herein has been depicted, described, and has been defined with reference to particular preferred embodiments, such references and examples of implementation in the foregoing specification do not imply any limitation on the invention. It will, however, be evident that various modifications and changes may be made thereto without departing from the broader scope of the technical concept. The presented preferred embodiments are exemplary only, and are not exhaustive of the scope of the technical concept presented herein.

Accordingly, the scope of protection is not limited to the preferred embodiments described in the specification, but is only limited by the cairns that follow.

The invention claimed is:

1. A computer-implemented method for managing display-related resources, the method comprising the steps of:
   receiving, at a client device, an input sequence of images from a remote server;
   analyzing the input sequence of images for presence of user input activity at the remote server; and
   in case of activity presence, configuring the display-related resources, of the client device, to refrain from invoking a resources saving action based on a signal indicative of the activity presence.

2. The computer-implemented method according to claim 1, wherein the input activity is evidence of use of input means selected from a group comprising a mouse, a touchpad, a keyboard, a remote control.

3. The computer-implemented method according to claim 1, wherein an object detection method for images or sequences of images is employed in order to detect cursor movement and/or typing activity.

4. The computer-implemented method according to claim 1, wherein the input sequences of images comprises an associated audio signal and the analyzing step comprises monitoring the associated audio in order to detect keystroke sounds or mouse clicks.

5. The computer-implemented method according to claim 1, wherein the resources saving action includes inhibiting invoking of a screen saver or reducing screen brightness in order to reduce energy consumption.

6. A non-transitory computer readable medium storing computer-executable instructions performing all the steps of the computer-implemented method according to claim 1 when executed on a computer.

* * * * *